US 8,739,666 B2

(12) United States Patent
Kollman (10) Patent No.: US 8,739,666 B2
(45) Date of Patent: Jun. 3, 2014

(54) WINDOW COVERING CUTTING MACHINE (75) Inventor: Michael Kollman, Fitchburg, WI (US)

(73) Assignee: Lumino, Inc., Madison, WI (US)

( * ) Notice: Subject to any disclaimer, the term of this patent is extended or adjusted under 35 U.S.C. 154(b) by 1549 days.

(21) Appl. No.: 12/349,691

(22) Filed: Jan. 7, 2009

(65) Prior Publication Data

US 2010/0170376 A1     Jul. 8, 2010

(51) Int. Cl.
| | |
|---|---|
| *B26D 5/20* | (2006.01) |
| *B27B 27/10* | (2006.01) |
| *B26D 7/01* | (2006.01) |
| *B27B 27/02* | (2006.01) |
| *B26D 5/02* | (2006.01) |
| *B23D 59/00* | (2006.01) |
| *E06B 9/266* | (2006.01) |
| *B23D 45/00* | (2006.01) |
| *B26D 7/02* | (2006.01) |
| *B26D 7/04* | (2006.01) |

(52) U.S. Cl.
CPC . *B26D 7/025* (2013.01); *B26D 7/02* (2013.01); *B26D 7/04* (2013.01); *B27B 27/10* (2013.01); *B26D 7/01* (2013.01); *B27B 27/02* (2013.01); *B26D 5/02* (2013.01); *B23D 59/001* (2013.01); *E06B 9/266* (2013.01); *B23D 45/003* (2013.01); *B23D 59/008* (2013.01)
USPC ................. 83/76.1; 83/76.8; 83/76.9

(58) Field of Classification Search
USPC ............ 83/76.9, 76.1, 76.8, 167, 467.1, 694; 29/24.5
See application file for complete search history.

(56) References Cited

U.S. PATENT DOCUMENTS

| | | | |
|---|---|---|---|
| 5,483,459 A * | 1/1996 | Tamura .................. 702/158 |
| 5,799,557 A | 9/1998 | Wang | |
| 5,816,126 A | 10/1998 | Pluber | |
| 5,927,172 A | 7/1999 | Wang | |
| 6,089,134 A | 7/2000 | Marocco | |
| 6,178,857 B1 | 1/2001 | Marocco | |
| 6,178,859 B1 * | 1/2001 | Pomerleau et al. ............ 83/76.9 |
| 6,334,379 B1 | 1/2002 | Sudano | |
| 6,412,381 B1 | 7/2002 | Wang et al. | |
| 6,427,571 B1 | 8/2002 | Hsu | |
| 6,615,698 B2 * | 9/2003 | Chuang et al. .................... 83/24 |
| 6,761,099 B2 | 7/2004 | Lin et al. | |
| 6,945,152 B2 | 9/2005 | Jabbari et al. | |
| 7,024,977 B2 | 4/2006 | Nien | |
| 7,118,028 B2 * | 10/2006 | Liu et al. ...................... 235/375 |
| 7,255,031 B2 * | 8/2007 | Nien et al. ...................... 83/465 |
| 7,987,754 B2 * | 8/2011 | Caputo et al. .................. 83/207 |
| 2001/0000856 A1 * | 5/2001 | O'Banion ...................... 83/76.9 |
| 2002/0020506 A1 | 2/2002 | Dekker et al. | |

(Continued)

*Primary Examiner* — Omar Flores Sanchez
(74) *Attorney, Agent, or Firm* — Buchanan Ingersoll & Rooney PC (57) ABSTRACT

A window covering cutting machine sized and configured to trim window covering work pieces is disclosed. The cutting machine includes a base, a work surface connected to the base, at least one cutting mechanism adjacent the work surface, one or more controllers connected to the one or more cutting mechanisms and at least one data entry device connected to the controller. The controller includes a program. The program is configured to determine an amount to be cut from a window covering work piece based on allowance input received from one or more of the data entry devices. The one or more controllers are configured to prompt a user to provide the allowance input to the program. The allowance input identifies an allowance value used by the program to determine the amount to be cut.

20 Claims, 6 Drawing Sheets

(56) References Cited

U.S. PATENT DOCUMENTS

| | | |
|---|---|---|
| 2004/0103767 A1* | 6/2004 | Lin et al. ............... 83/13 |
| 2004/0173079 A1* | 9/2004 | Caputo et al. ............ 83/694 |
| 2005/0115375 A1* | 6/2005 | Dick et al. ............ 83/358 |
| 2006/0156882 A1 | 7/2006 | Kollman et al. |
| 2007/0000363 A1 | 1/2007 | Kollman et al. |
| 2008/0034934 A1* | 2/2008 | Mekkelsen et al. ........... 83/76.9 |
| 2009/0107313 A1* | 4/2009 | Nien et al. ............ 83/76.8 |
| 2010/0107839 A1* | 5/2010 | Roberts et al. ............ 83/76.1 |
| 2010/0206144 A1* | 8/2010 | Caputo et al. ............ 83/13 |

* cited by examiner

WINDOW COVERING CUTTING MACHINE

FIELD OF INVENTION

The present invention relates to window covering cutting devices and control mechanisms for such devices,

BACKGROUND OF THE INVENTION

Stock blinds have grown in demand over the past few years in the window covering industry. Stock sized window treatments are typically mass produced by a manufacturer and sold at relatively low cost through home centers and other retail stores. A manufacturer will make stock blinds in multiple stock sizes that can be cut down in the store to fit most window openings. Such stock blinds are typically offered at lower costs than custom made window coverings. As a result, many customers consider stock window coverings to be more desirable than custom made window coverings.

Customers may select a stock blind or other stock shade that is relatively near, but larger than, the dimensions of a particular window opening to be covered and have the blind cut down to fit within the window opening. Retailers often have cutting machines configured to cut down the stock window covering products they may sell to customers so the product can be cut down at the time the consumer purchases the stock window covering. Typically, such window covering cutting machines are configured to cut the stock window covering so it may fit within window openings that have dimensions smaller than the stock window covering. Examples of such cutting machines are disclosed in U.S. Pat. Nos. 5,799,557, 5,816,126, 5,927,172, 6,089,134, 6,178,857, 6,334,379, 6,412,381, 6,427,571, 6,761,099, 6,945,152 and 7,024,977 and U.S. Patent Application Publication Nos. 2008/0087152, 2007/0000363, 2006/0156882 and 2002/0020506.

A retailer will often rely on a controller or processing unit of a window covering cutting machine to determine the amount of a stock window covering to cut. Typically, such controllers are configured to determine the amount to be cut based upon the difference in the dimensions of the stock window covering and the dimensions of the window opening in which the window covering will be mounted. The dimensions of a particular window opening are normally provided by the customer. The dimensions of a particular stock window covering are typically provided to the controller by user input, such as a bar code reader or key pad entry. Once the amount to be cut is determined, the retailer usually aligns a portion of the window covering with a cutting device to ensure the proper amount of the window covering is cut.

Window covering cutting machine controllers are often configured so that an allowance for the dimensions of the stock window covering is also factored into determining the amount to be cut from a stock window covering. Such an allowance is generally based on the type of mount the window covering is supposed to have. For example, a controller may be configured to have an allowance for window coverings that are to have an inside mount and another allowance for window coverings that will have an outside mount. Such allowances are typically a set value, such as 0.5 inches and are not adjustable.

In some window covering cutting machines, the allowance value may be set so the allowance used by the controller to determine an amount to be cut is different for different window covering types. For example, a controller may be configured so that a vinyl blind may have a predefined allowance of 0.25 inches while a cellular shade may have a predefined allowance of 0.75 inches. Such window covering cutting machines are not typically configured to permit a user to adjust the allowance that is used to ultimately determine the amount to be cut from a stock window covering.

Often, window covering cutting machines are configured to have allowances that cause the cutting machine to aggressively cut a stock blind down so that it will almost always be small enough to easily fit within a window opening. Such a configuration is often made to reduce the amount of window covering returns that may be made to a store. However, such aggressive allowances often cause a stock window covering to be cut down too much so that the window covering is too small. As a result, light gaps are created between a window and the trimmed window covering. Such light gaps can detract from the aesthetic effect of the window covering. Moreover, such light gaps can prevent a stock window covering from effectively covering a window.

In the event a customer returns a blind as a result of a cutting machine cutting a window covering to a size that is too small, a retailer is typically unable to provide a customer with a new cut down shade that is properly cut down to meet the customer's needs. For instance, the retailer is typically unable to adjust the allowance used by his or her cutting machine. Because the allowance cannot be changed, another stock blind that is cut down with the same cutting machine will normally be cut down such that it has the same light gap problem. Consequently, retailers often have a difficult time providing such a complaining customer with a stock window covering that satisfies that customer.

There is a need for a window covering cutting machine that is capable of permitting a user to adjust the allowance for a window covering cutting machine. Such adjustability can permit a retailer to ensure a stock window covering is cut down conservatively so that a sold stock window covering can be properly cut down so it may be installed by a customer or other installer without having any light gaps.

SUMMARY OF THE INVENTION

I provide a window covering cutting machine sized and configured to trim window covering work pieces. One embodiment of my window covering cutting machine includes a base, a work surface connected to the base, one or more cutting mechanisms adjacent the work surface, at least one controller and one or more data entry devices. The one or more controllers are connected to one or more of the cutting mechanisms and has a program. The one or more data entry devices are connected to the one or more controllers. The program is configured to determine an amount to be cut from a window covering work piece based on allowance input received from one or more of the data entry devices. The at least one controller is also configured to prompt a user to provide the allowance input to the program. The allowance input identifies an allowance value used by the program to determine the amount to be cut from the window covering work piece.

Of course, the one or more controllers may be connected to the one or more cutting mechanisms or one or more data entry devices by a direct connection. Such as wiring or connected processors, a wireless connection or by other connection mechanisms. The program of the one or more controllers may be stored in memory. In one embodiment, such memory is directly connected to the controller or is connected to a processor that is connected to the at least one controllers. In other embodiments, the program can be stored in memory that may be removably connected to the at least one controller.

It should be appreciated that the one or more controllers may be configured to receive the allowance input before determining the amount to be cut. In some embodiments, the one or more controllers may be configured so that an allowance input may be provided within a certain allowance range. For example, one allowance range that may be used can include an allowance that is greater than or equal to −0.5 inches and less than or equal to 0.25 inches. The at least one controller may be configured to transmit a data entry error message if the allowance input identifies an allowance value that is less than −0.5 inches or greater than 0.25 inches. Of course, other allowance ranges may also be used.

In one embodiment, the window covering cutting machine may also include one or more references adjacent one or more of the data entry devices. The one or more references may be configured to identify allowance input that a use should enter in one of the data entry devices for different window covering work pieces. Such references may include indicia that identifies window covering work pieces by manufacturer, window covering work piece type, window covering work piece size, or any combination thereof. The one or more references may also be configured to identify a preferred allowance input for each type of window covering work piece or window covering work piece size that is selected to cover certain sized window openings. For example, a reference may identify a window covering work piece type and size and then identify a preferred allowance input for such a work piece for covering window openings of a certain dimension or range of dimensions.

It should be understood that different window covering work pieces may be cut by embodiments of my cutting machine. For example, portions of shutters, blinds, shades, venetian blinds, cellular shades, pleated shades, roll-up shades, cordless shades, headrails, window covering material, slats, or bottom rails may be trimmed by embodiments of my cutting machine.

Of course, one or more displays may be included in embodiments of my cutting machine. For example, one or more displays may be connected to the one or more controllers, one or more of the data entry devices, or any combination thereof. The one or more displays may include liquid crystal displays, screens, monitors or other display devices.

In some embodiments, the one or more data entry devices can include one of more scanners, readers, touch screen displays, key pads, magnetic strip readers, radio frequency readers configured to read radio transponder tags located on a window covering work piece, or any combination thereof.

The program can be configured to determine a preliminary amount to be cut value based upon information about a window covering work piece received from one of the data entry devices. The at least one controller is also configured to determine the amount to be cut based on adding the allowance value to the preliminary amount to be cute.

In one embodiment, the program may be configured to determine the amount to be cut based on the allowance input and incorporation about a window covering work piece received from one or more of the data entry devices. The information about the window covering work piece can include one or more dimensions of a window or door over which the window covering work piece is to be mounted, one or more dimensions of the window covering work piece, the desired dimension of the window covering work piece, bar code information assigned to the window covering work piece and whether the window covering work piece will have an inside mount or an outside mount.

Embodiments of my cutting machine may also include one or more locators adjacent at least one of the one or more cutting machines and the work surface. The one or more locators are moveable relative to the one or more cutting mechanisms and are connected to the one or more controllers such that the controller causes that one or more locators to move based on the amount to be cut. Of course, one or more actuators may be connected to the one or more controllers and one or more of the locators so the one or more controllers cause at least one of the locators to move by causing the actuator to move the one or more locators.

It should be appreciated that the one or more cutting mechanisms can include one or more cutting devices. The cutting devices may include a blade or a die.

In some embodiments, my cutting machine also includes at least one end stop adjacent the one or more cutting mechanisms. The one or more end stops may be moveable relative to one or more of the cutting mechanism. The at least one controller can be connected to one or more of the end stops so that that controller causes the one or more end stops to move based on the amount to be cut.

Other details, objects, and advantages of the invention will become apparent as the following description of certain present preferred embodiments thereof proceeds.

BRIEF DESCRIPTION OF THE DRAWINGS

In the accompanying drawings I have shown certain present preferred embodiments of my window covering cutting machine in which.

DETAILED DESCRIPTION OF PRESENT PREFERRED EMBODIMENTS

Figure 1:
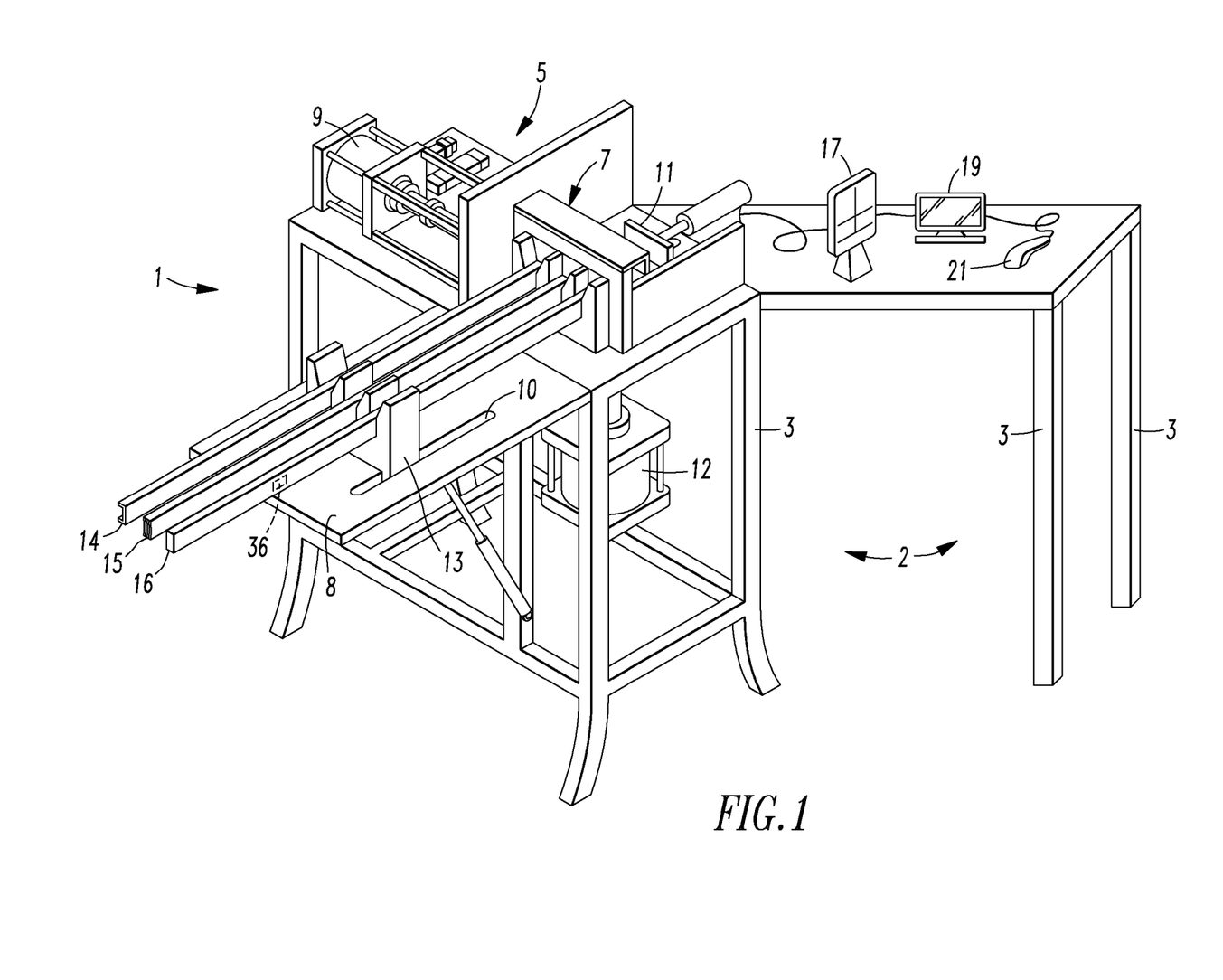
FIG. 1 is a perspective view of a first present preferred embodiment of my window covering cutting machine.

Referring to FIG. 1, a first present preferred embodiment 1 of my cutting machine has a base 2 that includes multiple supports 3 that support a work surface 8. A cutting mechanism 5 is located adjacent the work surface 8. The cutting mechanism 5 includes cutting dies 7 and actuators 9 and 12 that are connected to move respective cutting dies 7 to cut work pieces. An end stop 11 is also located adjacent the cutting mechanism 5. The end stop is moveable to multiple positions. A locator 13 is positioned adjacent the cutting mechanism 5 and work surface 8. The locator 13 is configured to hold multiple window covering work pieces 14, 15, and 16. The locator 13 is moveable relative to the cutting mechanism 5 by movement along slots 10 formed within the work surface 8. The locator 13 may be configured for manual movement by an associate so that the associate must slide the locator along the slots 10 to move the locator 13.

The locator 13 has slots sized and configured to receive and hold work pieces 14, 15 and 16. Work piece 14 is a headrail, work piece 15 includes slats and work piece 16 is a bottom rail. Each work piece extends into a die opening in the cutting mechanism sized to receive that work piece. The cutting dies are configured to cut respective work pieces.

A controller 17 is connected to the end stop 11 and cutting mechanism 5 such that the controller can cause actuators 9 and 12 to move the cutting dies 7 and cause the end stop 11 to move. The controller is also connected to a display 19 and data entry devices such as scanner 21, key pads 27, 28, 29 and 31 and button 33, which are shown in FIG. 3.

The scanner 21 may be a bar code scanner configured to read bar codes located on the work piece or the packaging of the work piece. The scanner 21 may alternatively be other scanners or readers. For example, scanner 21 could be a magnetic strip header or a radio frequency reader. Of course, more than one scanner may be connected to the controller 17 such that the scanners can provide input to the controller 17.

Figure 3:
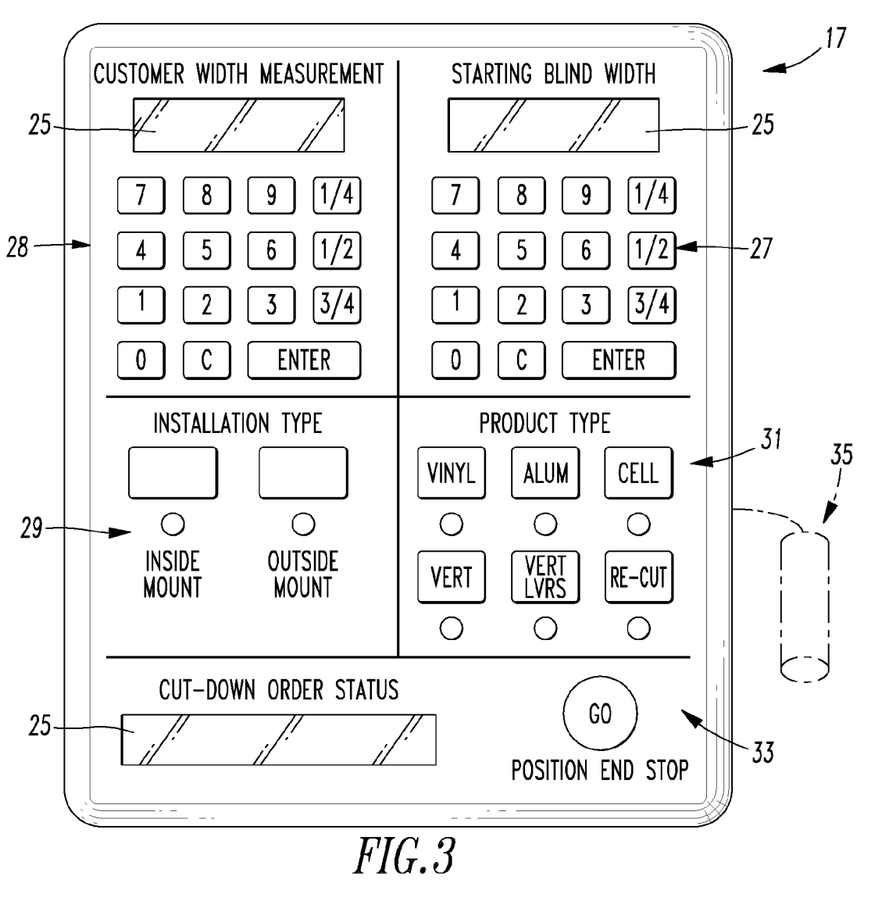
FIG. 3 is a front view of the first present preferred controller embodiment.

As shown in FIG. 3, the controller 17 includes a processor 41 that is operatively connected to memory 45. The controller is also operatively connected to displays and key pads by microchips 42 and 43. The processor 41 may include memory that has a program stored therein or may be configured to run or process a program within the memory 45.

The program of the controller 17 is configured to determine an amount to be cut from a window covering work piece. Such a calculation is based upon input the controller 17 receives from one or more of the data entry devices it is connected to, such as key pads 27, 28, 29 or 31 or scanner 21. For example, a user may enter the dimensions of a window covering work piece by using number keys of key pad 27 and the width of the window opening the work piece will be mounted to with key pad 28. The installation type may be identified by pressing the appropriate inside mount button or, outside mount button of key pad 29. The type of work piece may also be identified by pressing a button that identifies the work piece type on key pad 31.

In an alternative embodiment, the work piece type may be identified by scanning a bar code or magnetic strip on the packaging of the work piece or on the work piece to identify the starting work piece width or length and product type. The program of the controller 17 may also be configured to identify the work piece type or other work piece information by cross-referencing the input provided by the scanner with one or more databases related to such work pieces that are stored in the memory. For example, the input provided by the scanner may include a model number that the program is configured to reference with a model number database to identify one or more dimensions of the scanned work piece.

Figure 2:
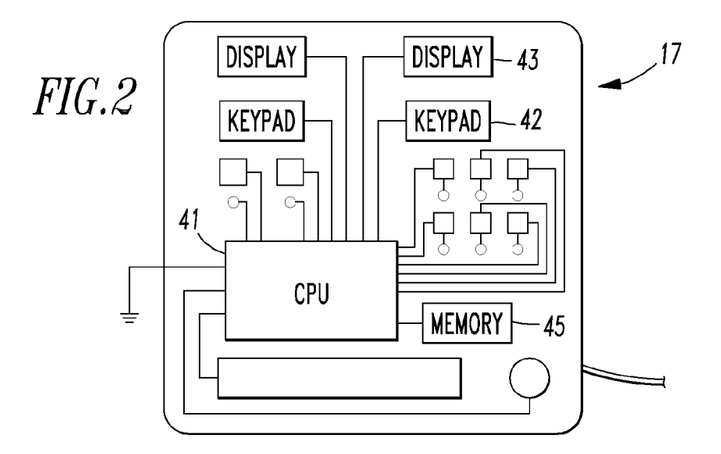
FIG. 2 is a block diagram of a first present preferred controller embodiment.

As another alternative, one or more of the work pieces may have a radio frequency transponder 36, as shown in dotted line in FIG. 1, which sends a signal to a radio frequency receiver 35 connected to the controller 17, which is shown in dotted line in FIG. 2. The transponder 36 provides input that permits the program of the controller 17 to identify one or more dimensions of the work piece, the type of work piece, other work piece information or any combination thereof to the program.

Of course other variations of providing input to the controller 17 or a program of the controller may also be made. For instance, a user may press a sequence of buttons on a keyboard or keypad that is recognized by the controller to correspond with a work piece type, work piece dimension, other work piece related information, or a combination thereof that is used by the program to calculate an amount to be cut or reference other data that is used to calculate the amount to be cut from the work piece.

Once the work piece information is provided to the controller, the program is configured to calculate a preliminary amount to be cut value for the work piece. The program is then configured to prompt the user to provide an allowance input by displaying a prompt to the user in one of the displays 25 located on the controller. In an alternative embodiment, the program may be configured to display the prompt on a display 19 located adjacent the controller 17 or provide the prompt with an audio output that asks for an allowance input to be provided by the user. Such an audio output may include a sound, sequence of sounds, or audible message spoken in a language of the user, such as the English language. Of course, the prompt may also include a combination of visual and audio output that is transmitted to a user.

The allowance input may be entered using a key pad connected to the controller, such as key pad 27 or keypad 28. Once the allowance input has been entered by the user, the program adjusts the preliminary amount to be cut by adding the allowance value to calculate the amount to be cut from the work piece so the trimmed work piece fits within the window opening dimensions provided to the controller 17. It should be understood that the allowance value may be input that is directly received by the program from input provided to a data entry device or a value that is obtained or determined by the program as a result of receiving the allowance input.

After the amount to be cut is calculated, the program causes the end stop 11 to move to adjust the end stop 11 to ensure the proper amount is cut from the work piece. Of course, if the end stop 11 is already in the proper position, the controller is configured not to move the end stop 11. A user may be required to push an end stop actuator button 33 before the controller causes the end stop 11 to move to the correct position. Alternatively, the program can be configured to automatically cause the end stop 11 to move after receiving the allowance input from the user.

Once the end stop 11 has been moved to the proper location, a user may align the work pieces with the cutting mechanism 5 for trimming by adjusting the position of the locator 13 to move the work pieces 14, 15 and 16 about to be cut by the cutting mechanism 5. The work pieces will be aligned for trimming when an end of each work piece abuts the end stop 11. The user may then enter input to the program so the program causes the actuators 9 and 12 to move the cutting dies to cut the work pieces 14, 15 and 16.

Of course, the controller 17 may alternatively be configured to automatically move the locator 13 to position the work pieces 14, 15 and 16 and then automatically cause the actuators 9 and 12 to move the cutting dies 7 to cut the work pieces. Such an embodiment of my cutting machine may also include a third actuator (not shown) that is configured to move the locator 13 along the slots 10 to the appropriate position.

Figure 4:
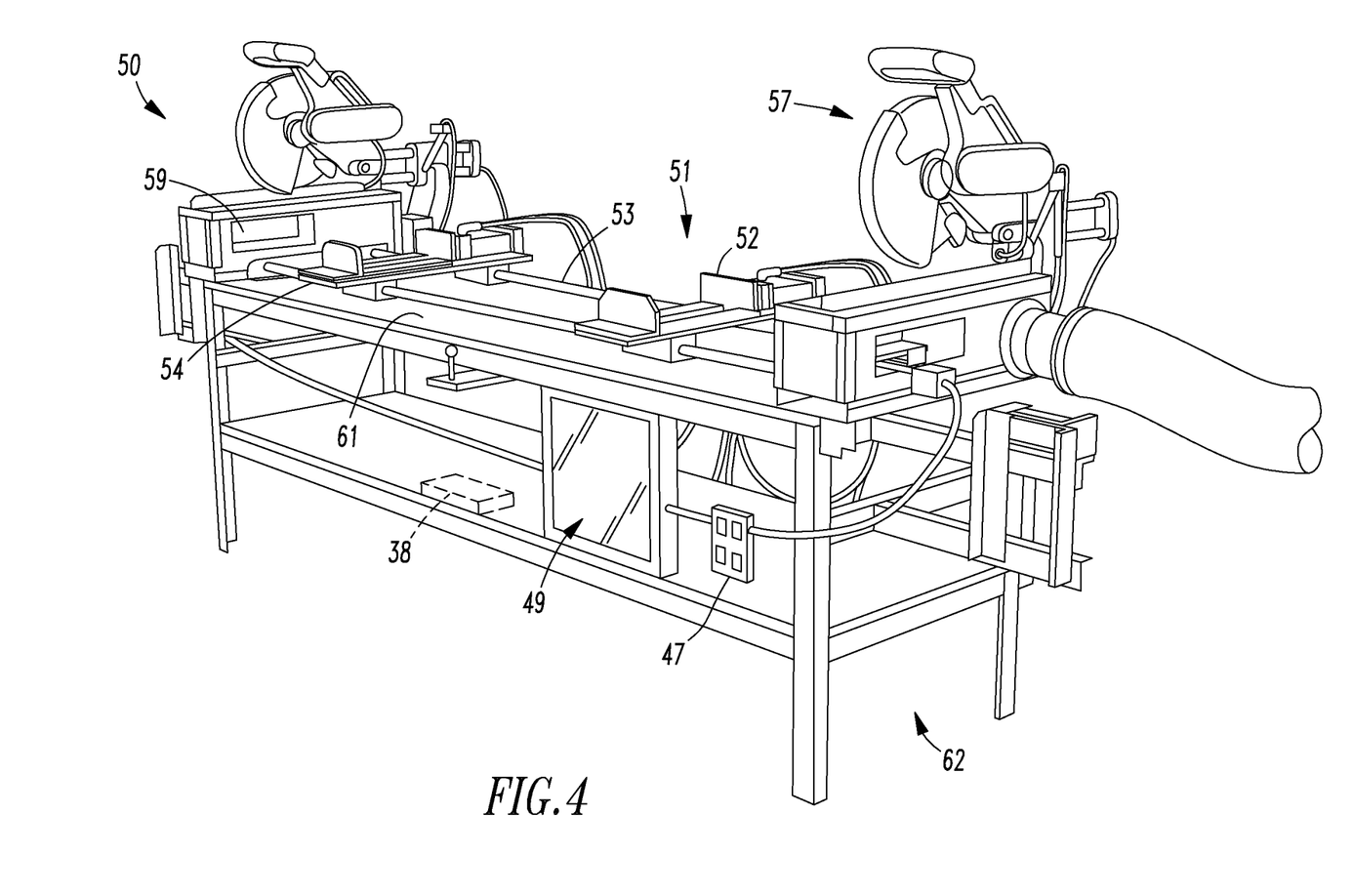
FIG. 4 is a perspective view of a second present preferred embodiment of my window covering cutting machine.

Embodiments of my cutting machine may also include multiple cutting mechanisms. For instance, an embodiment 50 may include a base 62 that supports a work surface 61 and has two rotary blades 57 connected to the work surface 61 adjacent opposite ends of the work surface 61, as shown in FIG. 4. A wall with an opening 59 sized and configured to receive work pieces positioned below the rotary blades 57. A work piece may be positioned so that a portion about to be cut by a blade 57 is positioned through the opening 59.

Moveable locators 51 may be positioned adjacent the work surface 61 that are moveable relative to the rotary blades 57. The locators 51 include a moveable surface 54 and a clamp 52 configured to move to hold a work piece on the moveable work surface 54. The moveable work surface 54 is moveably attached to rods 53 such that the work surfaces 54 move along the rods 53. A controller 47 is connected to the rods 53 and a touch screen display 49. The controller 47 is configured to cause the moveable work surfaces 54 to move. A user may provide input to the controller by entering data on the touch screen display 49.

The touch screen display 49 may also be configured to display reference materials such that the touch screen display may also act as a reference for a user. The reference materials displayed by the touch screen display may include suggested allowance input that a user should enter for different window covering work pieces. For example, such reference information may include identifying a work piece by manufacturer, work piece type, work piece size, mount type (e.g. inside mount or outside mount), and work piece style. Of course, alternative embodiments may include reference materials such as a reference book 38, which is shown in dotted line in FIG. 4, or a reference pamphlet that contains such information. Such reference materials may be provided adjacent to a data entry device, display, work surface, base, or controller.

Figure 5:
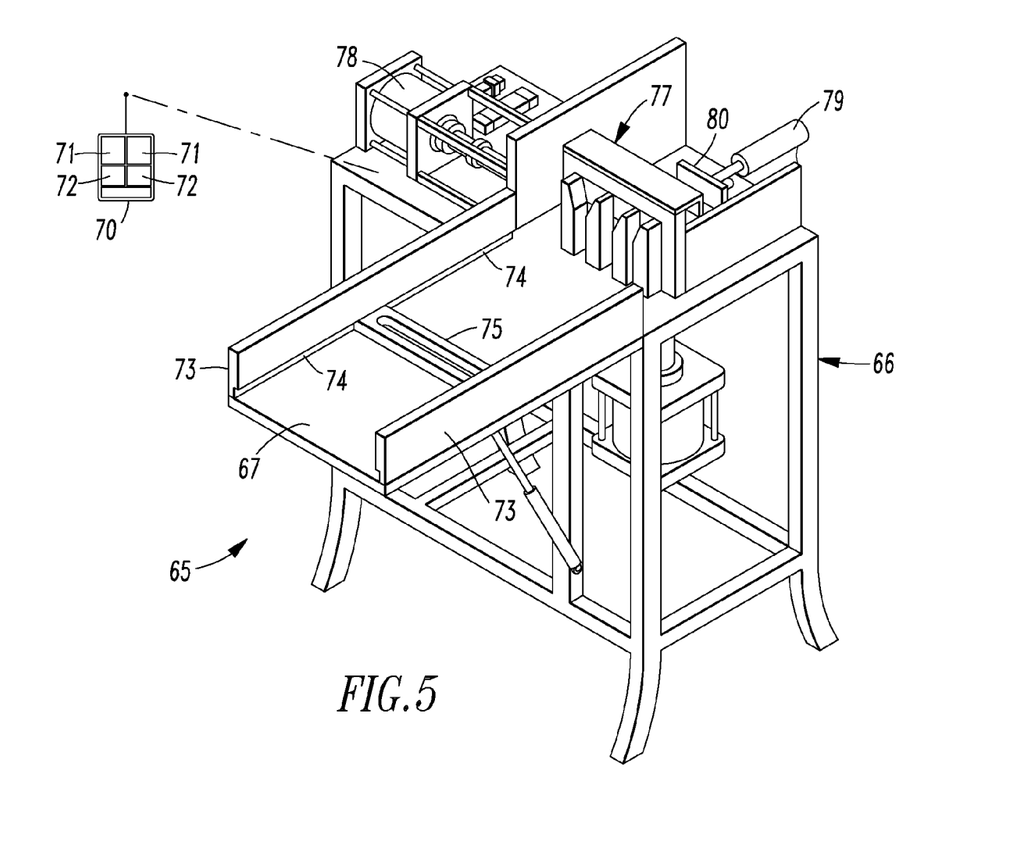
FIG. 5 is a perspective view of a third present preferred embodiment of my window covering cutting machine.

Embodiments of my cutting machine may also include controllers that are connected to one or more other components of the cutting machine by at least one wireless connection, as shown in FIG. 5. An embodiment 65 of my cutting machine may include a base 66 that is attached to a work surface 67. Sidewalls 73 may be positioned along two opposite edges of the work surface 67. Each sidewall has a groove 74 sized and configured to receive an end of a locator 75. The locator 75 is configured to move relative to a cutting mechanism 77 attached to the base 66 adjacent to the work surface 67. A moveable end stop 80 is positioned adjacent the cutting mechanism 77. An actuator 79 is connected to the end stop 80 and is configured to move the end stop 80 relative to the cutting mechanism 77. An actuator 78 is connected to the cutting mechanism 77 and is configured to move the cutting devices of the cutting mechanism 77 to cut window covering work pieces.

A controller 70 is connected to actuators 78 and 79 by a wireless correction and is configured to cause the actuator 79 to move the end stop 80 and the actuator 78 to cause the cutting devices of the cutting mechanism 77 to move. The controller 70 has displays 71 and key pads 72 located on the housing of the controller 70. The controller 70 also includes a program that is stored in memory connected to the controller 70 so that a user may manipulate the key pads 72 to operate the controller 70 and cause the controller 70 to run the program. The memory may be physically housed within the controller 70 and connected to one or more processors of the controller 70 or be stored in a remote location, such as a server, that is connected to the controller 70 through a wireless connection or other network connection. The program of the controller 70 may be configured to run similarly to the program described above.

Figure 6:
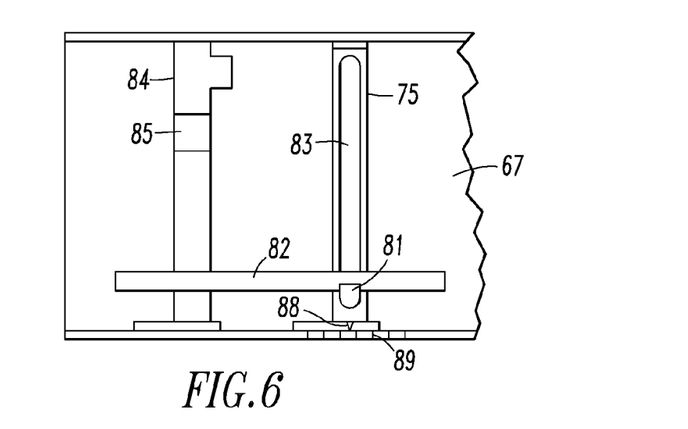
FIG. 6 is a flagmentary top view of a fourth present preferred embodiment of my window covering cutting machine.

As may best be appreciated from FIGS. 6-9, different locators may be configured to move adjacent the work surface 67. A locator 75 may be configured to hold a work piece 82 with one or more clips 81 sized to be received an opening 93 formed in the body of the locator 75, as shown in FIG. 6. A second locator 84 may also be used to hold the work piece 82. The second locator 84 may include a body that has openings 85 sized to receive the work piece 82.

Figure 7:
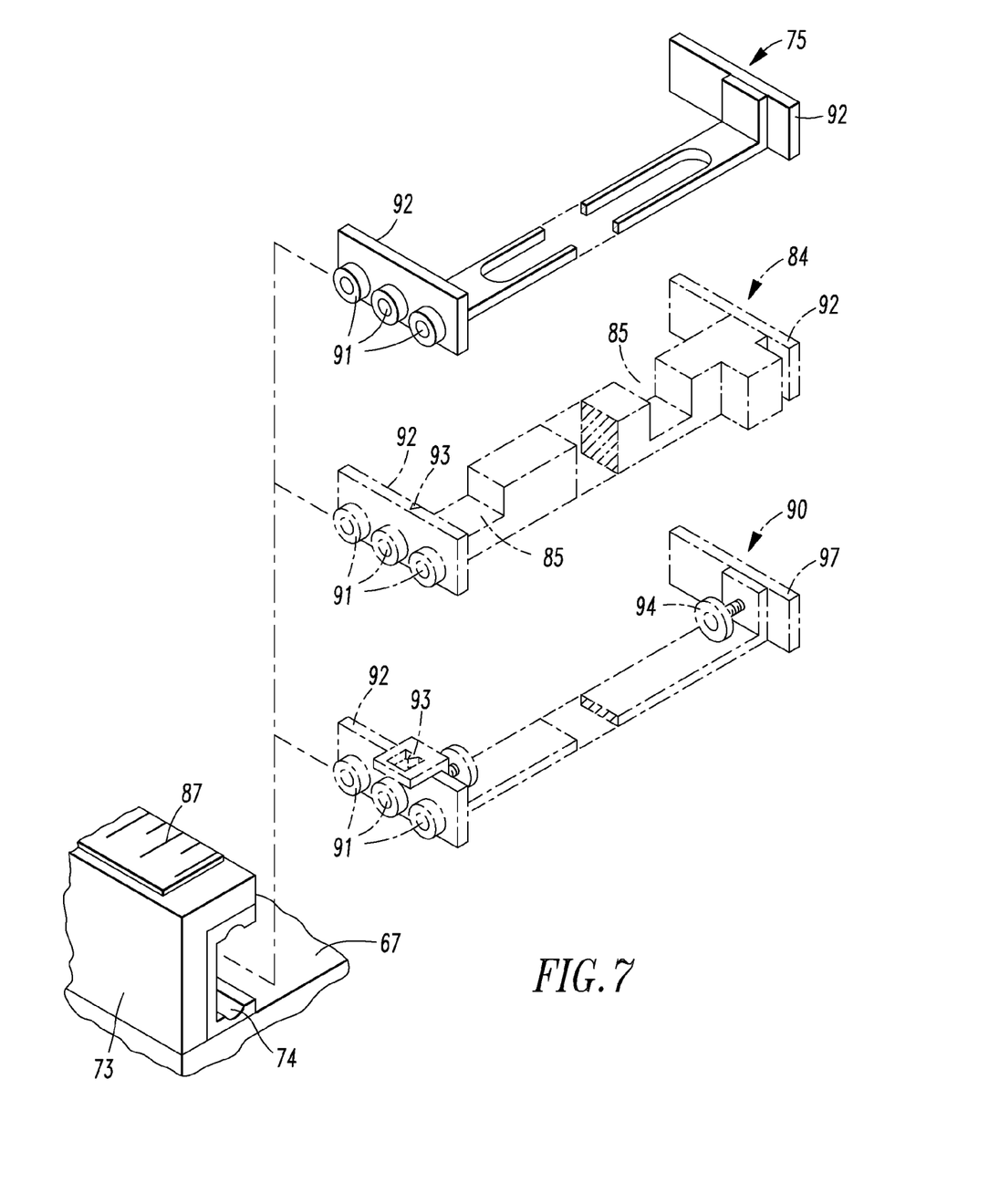
FIG. 7 is an exploded view of a present preferred locator embodiment and two alternate configurations of that locator shown in dotted line that may be connected to a portion of a first present preferred embodiment of a base.

As another alternative, a locator 90 may include a body that has two ends 92 and clamps 94 positioned adjacent the ends 92 of the locator 90. The clamps 94 are configured to adjustably move to engage or hold different work pieces.

Figure 8:
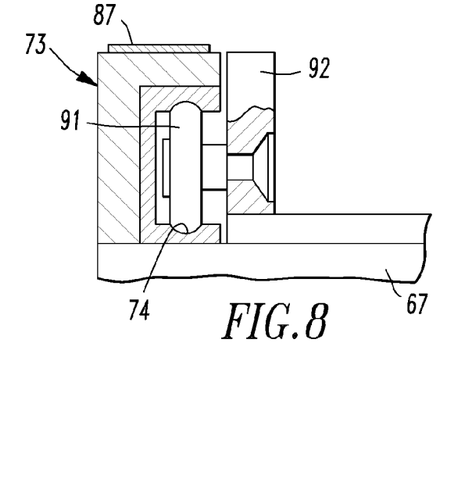
FIG. 8 is a cross sectional view taken along line XII-XII in FIG. 11 of one embodiment of a locator connected to the fifth present preferred embodiment of the cutting machine.

The ends 92 of any of locators 75, 84 or 90 includes wheels 91 that are sized and configured to move along grooves 74 in the sidewalls 73 so that the locators may move relative to a cutting mechanism 77. An end 92 of a locator may also include an indicator 93 or other device that is configured to identify a cutting length or other measurement on a ruler or other measurement device or measurement indicia 87 located adjacent a sidewall 73. It should be appreciated that such an indicator 91 permits a user to verify that he or she has properly moved a work piece to the correct position to cut down a work piece or that the controller has properly moved the work piece to the correct position.

Figure 9:
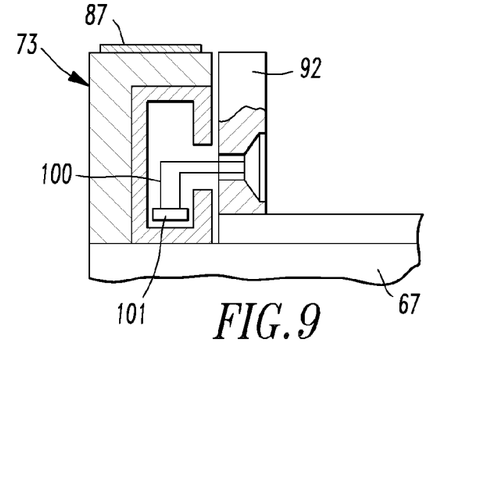
FIG. 9 is a cross sectional view similar to FIG. 8 of another embodiment of a locator connected to a sixth present preferred embodiment of the cutting machines.

Of course, the end 92 of each locator does not have to have wheels 91. As shown in FIG. 9, the ends 92 of a locator may be configured to have projections 100 that extend from each end 92 and engage a moveable belt 101 that runs along the grooves 74. As yet another alternative the distal end of each projection 100 may be configured to engage a sidewall 73 or fit within a groove 74 in the sidewall 73 to slide or move along the groove 74 formed in that sidewall 73.

Figure 10:
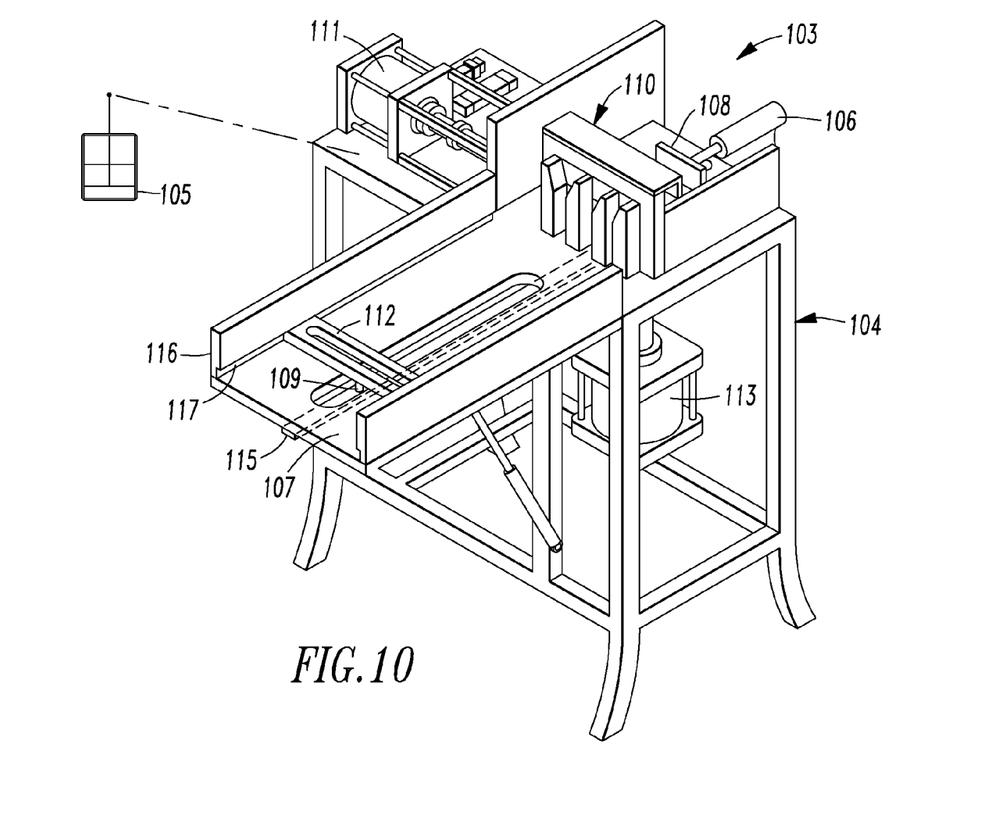
FIG. 10 is a perspective view of a seventh present preferred embodiment of my window covering cutting machine.

A controller may also be configured to cause a locator to move. Embodiment 103 of my cutting machine, which is shown in FIG. 10, includes a locator 112 that has ends sized to fit within grooves 117 of sidewalls 116 that extend along opposite edges of a work surface 107 that is supported on a base 104. The ends of the locator 112 are configured to move along the grooves 117. The locator 112 is connected to a drive belt 115 that extends along the bottom of the work surface 107. The locator is connected to the drive belt by a rod 109 or other connector that extends through a slot formed in the work surface. The belt 115 is connected to an actuator 113 that is configured to cause the belt to move relative to a cutting mechanism 110 positioned adjacent the work surface 107. Movement of the belt 115 causes the locator 112 to move. An actuator 111 is connected to the cutting mechanism and is configured to cause the cutting mechanism 110 to cut work pieces. An end stop 108 is positioned adjacent the cutting mechanism 110 and is connected to an actuator 106 that causes the end stop 108 to move relative to the cutting mechanism 110.

A controller 105 has a wireless connection to the actuators 106, 111 and 113 and is configured to cause the actuator 113 to move the locator 112 to adjust the position of a work piece held by the locator 112. The controller may also cause the end stop 108 to move to abut an end of the work piece to ensure the proper amount of the work piece is cut by the cutting mechanism 110. Once a work piece is positioned to permit the cutting mechanism to trim a work piece, the controller causes the actuator 111 to move the cutting devices of the cutting mechanism 110 to trim the work piece.

The controller 105 has a program that is stored in memory that is run to calculate the amount to be cut from a work piece. The controller 105 causes the work piece to be moved by the locator 112 based on the calculated amount to be cut. The program is configured to calculate the amount to be cut based on work piece related information provided to the controller. The program is also configured to cause a display to prompt a user for entry of allowance input. Such a prompt for allowance input may include a query displayed in one or more displays or provided in audio output that asks a user to confirm that a predetermined allowance should be used. The user then must enter input that either confirms that the predetermined allowance value should be used or that the value must be changed to a new value for trimming a work piece. If the predetermined allowance value should be changed, the program can be configured to cause a display to ask the user to enter the new allowance input that identifies the allowance value that should be used to calculate the amount to be cut from the work piece. The user may then enter allowance input that identifies the allowance value that will be used by the program to calculate the amount to be cut from the work piece.

In some embodiments, the program may be configured to limit the allowance value entry that allowance input may identify. Preferably, the program is configured to ensure all allowance value used by the program to calculate an amount to cut from a work piece is not less than −0.5 inches and not more than 0.25 inches. In the event a user enters an allowance input that relates to an allowance value that is outside of the preferred range, such as an allowance input that corresponds to an allowance value of −0.6 inches or 0.35 inches, the program may be configured to transmit a data entry error message to a user. The error message may be displayed on a display, provided audibly through a speaker connected to the controller or both. For example, an error message may include a display asking for the allowance input to be provided in combination with the emission of a sound that indicates an improper or erroneous entry was made by a user.

It should be appreciated that variations of the present preferred embodiments discussed above may be made. For example, one or more drive chains, one or more other drive members or other drive mechanisms may be used instead of a drive belt to move the position of the locator 112. As another example, a cutting mechanism may include dies, rotary blades, guillotine blades, a combination of such cutting devices or other cutting devices. As yet another example, a base may include a stand, a plurality of legs or supports or other structure configured to support components of the cutting machine.

Of course, an embodiment of my window covering cutting machine may be configured to cut various different types of window covering work pieces. It should be understood that a window covering work piece is not limited to the headrail, bottom rail, and slat work pieces shown in FIG. 1. For example, a window covering work piece may also include a shutter, one or more louvers, one or more vertical slats, a shutter component, window covering material, pleated material, cellular material, a cordless shade, a blind, a shade, a venetian blind, and other window coverings or window covering components.

While I have shown and described certain present preferred embodiments of my window covering cutting machine and have illustrated certain present preferred methods of making and using the same, it is to be distinctly understood that the invention is not limited thereto but may be otherwise variously embodied and practiced within the scope of the following claims.

I claim:

1. A window covering cutting machine sized and configured to trim window covering work pieces comprising:
   a base;
   a work surface connected to the base;
   at least one cutting mechanism adjacent the work surface;
   at least one controller connected to the at least one cutting mechanism, the at least one controller having a program;
   at least one data entry device connected to the at least one controller; and
   the program determining an amount to be cut from a window covering work piece based on allowance input received from the at least one data entry device and information about the window covering work piece received from the data entry device, the at least one controller configured to prompt a user to provide the allowance input to the program, the allowance input identifying an allowance value used by the program to determine the amount to be cut, the program determining the amount to be cut from the window covering work piece by combining the allowance value identified by the allowance input with a preliminary amount to be cut, the preliminary amount to be cut being determined by the program based upon the information about the window covering work piece received from the at least one data entry device.

2. The window covering cutting machine of claim 1 wherein the at least one controller prompting the user to provide the allowance input after the preliminary amount to be cut is determined and receiving the allowance input before determining the amount to be cut.

3. A window covering cutting machine sized and configured to trim window covering work pieces comprising:
   a base;
   a work surface connected to the base;
   at least one cutting mechanism adjacent the work surface;
   at least one controller connected to the at least one cutting mechanism, the at least one controller having a program;
   at least one data entry device connected to the at least one controller; and
      the controller running the program to determine an amount to be cut from a window covering work piece based on allowance input received from the at least one data entry device and information about the window covering work piece received from the data entry device, the at least one controller prompting a user to provide the allowance input, the allowance input identifying an allowance value used by the program to determine the amount to be cut;
   wherein the information about the window covering work piece identifies one of (i) a dimension of a window over which the window covering work piece is to be mounted, (ii) a desired dimension of the work piece to be cut and (iii) a dimension of a door over which the window covering work piece is to be mounted; and
   the information about the window covering work piece also identifying a dimension of the work piece to be cut and whether the work piece will have an inside mount or an outside mount.

4. The window covering cutting machine of claim 3 wherein the at least one controller transmits a data entry error message upon a determination that the allowance input identifies an allowance value that is less than −0.5 inches or greater than 0.25 inches.

5. The window covering cutting machine of claim 3 further comprising at least one reference adjacent the at least one data entry device, the at least one reference identifying allowance input that a user should enter in the at least one data entry device for different window covering work pieces.

6. The window covering cutting machine of claim 5 wherein the at least one reference identifies window covering work pieces by at least one of manufacturer, window covering work piece type and window covering work piece size.

7. The window covering cutting machine of claim 3 wherein the at least one entry device is at least one device selected from the group consisting of scanners, touch screen displays and keypads and wherein the information about the window covering work piece also identifies bar code information assigned to the work piece.

8. The window covering cutting machine of claim 3 further comprising at least one display connected to at least one of the at least one controller and the at least one data entry device.

9. The window covering cutting machine of claim 3 wherein the window covering cutting machine is sized and configured to trim window covering work pieces selected from the group consisting of shades, blinds, shutters, headrails, bottom rails, window covering material and slats.

10. The window covering cutting machine of claim 3 wherein the program determines a preliminary amount to be cut value based upon the information about the window covering work piece received from the at least one data entry device and wherein the amount to be cut is determined based on adding or subtracting the allowance value to the preliminary amount to be cut value.

11. The window covering cutting machine of claim 3 further comprising at least one locator connected to the work surface adjacent the at least one cutting mechanism, the at least one locator moveable relative to the at least one cutting mechanism, the at least one locator connected to the at least one controller such that the at least one controller causes the at least one locator to move based on the amount to be cut.

12. The window covering cutting machine of claim 11 further comprising an actuator connected to the at least one controller and the at least one locator wherein the at least one controller causes the at least one locator to move by causing the actuator to move the at least one locator.

13. The window covering cutting machine of claim 3 wherein the at least one cutting mechanism is comprised of at least one cutting device selected from the group consisting of blades and dies.

14. The window covering cutting machine of claim 3 further comprising at least one end stop adjacent the at least one cutting mechanism.

15. The window covering cutting machine of claim 14 wherein the at least one end stop is moveable relative to the at least one cutting mechanism, the at least one end stop connected to the at least one controller such that the at least one controller causes the at least one end stop to move based on the determined amount to be cut.

16. The window covering cutting machine of claim 3 wherein the at least one controller transmits a data entry error message upon a determination that the allowance value is not within an acceptable allowance value range.

17. The window covering cutting machine of claim 16 further comprising at least one display connected to the at least one controller, wherein the error message is transmitted to the at least one display such that the error message is displayed on the at least one display.

18. The window covering cutting machine of claim 17 wherein the error message is comprised of an audio output.

19. The window covering cutting machine of claim 17 wherein the acceptable allowance value range is −0.5 inches to 0.25 inches.

20. A window covering cutting machine sized and configured to trim window covering work pieces comprising:
a base;
a work surface connected to the base;
at least one cutting mechanism adjacent the work surface;
at least one controller connected to the at least one cutting mechanism, the at least one controller having a program;
at least one data entry device connected to the at least one controller;
at least one locator adjacent the work surface that is moveable relative to the at least one cutting mechanism;
the program is run by the at least one controller to determine an amount to be cut based on allowance input received from the at least one data entry device and information about a window covering work piece received from the at least one data entry device, the information about the window covering work piece identifying one of a dimension of a window or door over which the window covering work piece is to be mounted and a desired dimension of the work piece to be cut; and
the information about the window covering work piece also identifying a dimension of the work piece to be cut and whether the work piece will have an inside mount or an outside mount; and
the at least one controller prompting a user to provide the allowance input to the program, the allowance input identifying an allowance value used by the program to determine the amount to be cut; and
wherein the at least one controller transmits a data entry error message upon a determination that the allowance value is not within an acceptable allowance value range.

\* \* \* \* \*